United States Patent
Yea et al.

(10) Patent No.: US 11,284,111 B2
(45) Date of Patent: Mar. 22, 2022

(54) TECHNIQUES AND APPARATUS FOR INTER-CHANNEL PREDICTION AND TRANSFORM FOR POINT-CLOUD ATTRIBUTE CODING

(71) Applicant: TENCENT AMERICA LLC, Palo Alto, CA (US)

(72) Inventors: Sehoon Yea, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/034,896

(22) Filed: Sep. 28, 2020

(65) Prior Publication Data

US 2021/0112276 A1    Apr. 15, 2021

Related U.S. Application Data

(60) Provisional application No. 62/913,495, filed on Oct. 10, 2019.

(51) Int. Cl.
*H04N 19/597* (2014.01)
*H04N 19/192* (2014.01)
*H04N 19/61* (2014.01)
*H04N 19/46* (2014.01)
*H04N 19/186* (2014.01)

(52) U.S. Cl.
CPC ........ *H04N 19/597* (2014.11); *H04N 19/186* (2014.11); *H04N 19/192* (2014.11); *H04N 19/46* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 2005/0259730 A1* | 11/2005 | Sun ...................... | H04N 19/176 375/240.03 |
| 2015/0373327 A1 | 12/2015 | Zhang et al. | |
| 2016/0086353 A1 | 3/2016 | Lukac et al. | |
| 2018/0268570 A1 | 9/2018 | Budagavi et al. | |
| 2019/0087978 A1 | 3/2019 | Tourapis et al. | |
| 2019/0149827 A1* | 5/2019 | Xu ...................... | H04N 19/159 375/240.12 |

(Continued)

OTHER PUBLICATIONS

International Search Report dated Jan. 15, 2021, issued by the International Searching Authority in application No. PCT/US2020/053979.

(Continued)

*Primary Examiner* — Frederick D Bailey
(74) *Attorney, Agent, or Firm* — Sughrue Mion, PLLC

(57) ABSTRACT

A method of point cloud attribute coding performed by at least one processor, including obtaining an encoded bitstream corresponding to a point cloud; determining whether the encoded bitstream was encoded using an inter-channel tool for inter-channel decorrelation; based on determining that the encoded bitstream was encoded using the inter-channel tool, decoding the encoded bitstream using the inter-channel tool to reconstruct an attribute signal corresponding to the point cloud; and reconstructing the point cloud using the reconstructed attribute signal.

20 Claims, 9 Drawing Sheets

(56) References Cited

U.S. PATENT DOCUMENTS

2020/0336738 A1\* 10/2020 Xiu ..................... H04N 19/176
2020/0366900 A1\* 11/2020 Jun ..................... H04N 19/159
2020/0374538 A1\* 11/2020 Nguyen ................ H04N 19/50
2021/0297680 A1\* 9/2021 Wang .................... H04N 19/50

OTHER PUBLICATIONS

Written Opinion dated Jan. 15, 2021, issued by the International Searching Authority in application No. PCT/US2020/053979.

\* cited by examiner

TECHNIQUES AND APPARATUS FOR INTER-CHANNEL PREDICTION AND TRANSFORM FOR POINT-CLOUD ATTRIBUTE CODING

CROSS-REFERENCE TO RELATED APPLICATION

This application claims priority from U.S. Provisional Patent Application No. 62/913,945, filed on Oct. 10, 2019, in the U.S. Patent and Trademark Office, which is incorporated herein by reference in its entirety.

BACKGROUND

1. Field

Methods and apparatuses consistent with embodiments relate to video coding and decoding using graph-based point cloud compression (G-PCC), video encoders and decoders performing the same, and more particularly, coding of attribute information of point cloud samples, including using inter-channel prediction and transforms.

2. Description of Related Art

Advanced three-dimensional (3D) representations of the world are enabling more immersive forms of interaction and communication, and also allow machines to understand, interpret and navigate our world. 3D point clouds have emerged as an enabling representation of such information. A number of use cases associated with point cloud data have been identified, and corresponding requirements for point cloud representation and compression have been developed.

A point cloud is a set of points in a 3D space, each with associated attributes, e.g., color, material properties, etc. Point clouds can be used to reconstruct an object or a scene as a composition of such points. They can be captured using multiple cameras and depth sensors in various setups, and may be made up of thousands up to billions of points to realistically represent reconstructed scenes.

Compression technologies are needed to reduce the amount of data to represent a point cloud. As such, technologies are needed for lossy compression of point clouds for use in real-time communications and six degrees of freedom (6 DoF) virtual reality. In addition, technology is sought for lossless point cloud compression in the context of dynamic mapping for autonomous driving and cultural heritage applications, etc. The Moving Picture Experts Group (MPEG) has started working on a standard to address compression of geometry and attributes such as colors and reflectance, scalable/progressive coding, coding of sequences of point clouds captured over time, and random access to subsets of a point cloud.

SUMMARY

According to embodiments, a method of point cloud attribute coding is performed by at least one processor, and includes obtaining an encoded bitstream corresponding to a point cloud; determining whether the encoded bitstream was encoded using an inter-channel tool for inter-channel decorrelation; based on determining that the encoded bitstream was encoded using the inter-channel tool, decoding the encoded bitstream using the inter-channel tool to reconstruct an attribute signal corresponding to the point cloud; and reconstructing the point cloud using the reconstructed attribute signal.

According to embodiments, an apparatus for point cloud attribute coding includes at least one memory configured to store computer program code; and at least one processor configured to access the at least one memory and operate according to the computer program code, the computer program code including first obtaining code configured to cause the at least one processor to obtain an encoded bitstream corresponding to a point cloud; determining code configured to cause the at least one processor to determine whether the encoded bitstream was encoded using an inter-channel tool for inter-channel decorrelation; decoding code configured to cause the at least one processor to, based on determining that the encoded bitstream was encoded using the inter-channel tool, decode the encoded bitstream using the inter-channel tool to reconstruct an attribute signal corresponding to the point cloud; and reconstructing code configured to cause the at least one processor to reconstruct the point cloud using the reconstructed attribute signal.

According to embodiments, a non-transitory computer-readable medium stores instructions including one or more instructions that are configured to, when executed by one or more processors of a device for point cloud attribute coding, cause the one or more processors to: obtain an encoded bitstream corresponding to a point cloud; determine whether the encoded bitstream was encoded using an inter-channel tool for inter-channel decorrelation; based on determining that the encoded bitstream was encoded using the inter-channel tool, decode the encoded bitstream using the inter-channel tool to reconstruct an attribute signal corresponding to the point cloud; and reconstruct the point cloud using the reconstructed attribute signal.

DETAILED DESCRIPTION

Embodiments relate to the current G-PCC lifting design, and to methods of extending or modifying it to enable lossless coding of lifting coefficients. In addition, embodiments relate to scalable coding of attributes under the current G-PCC lifting design. These embodiments can be applied to similar codecs designed for point clouds.

Figure 1:
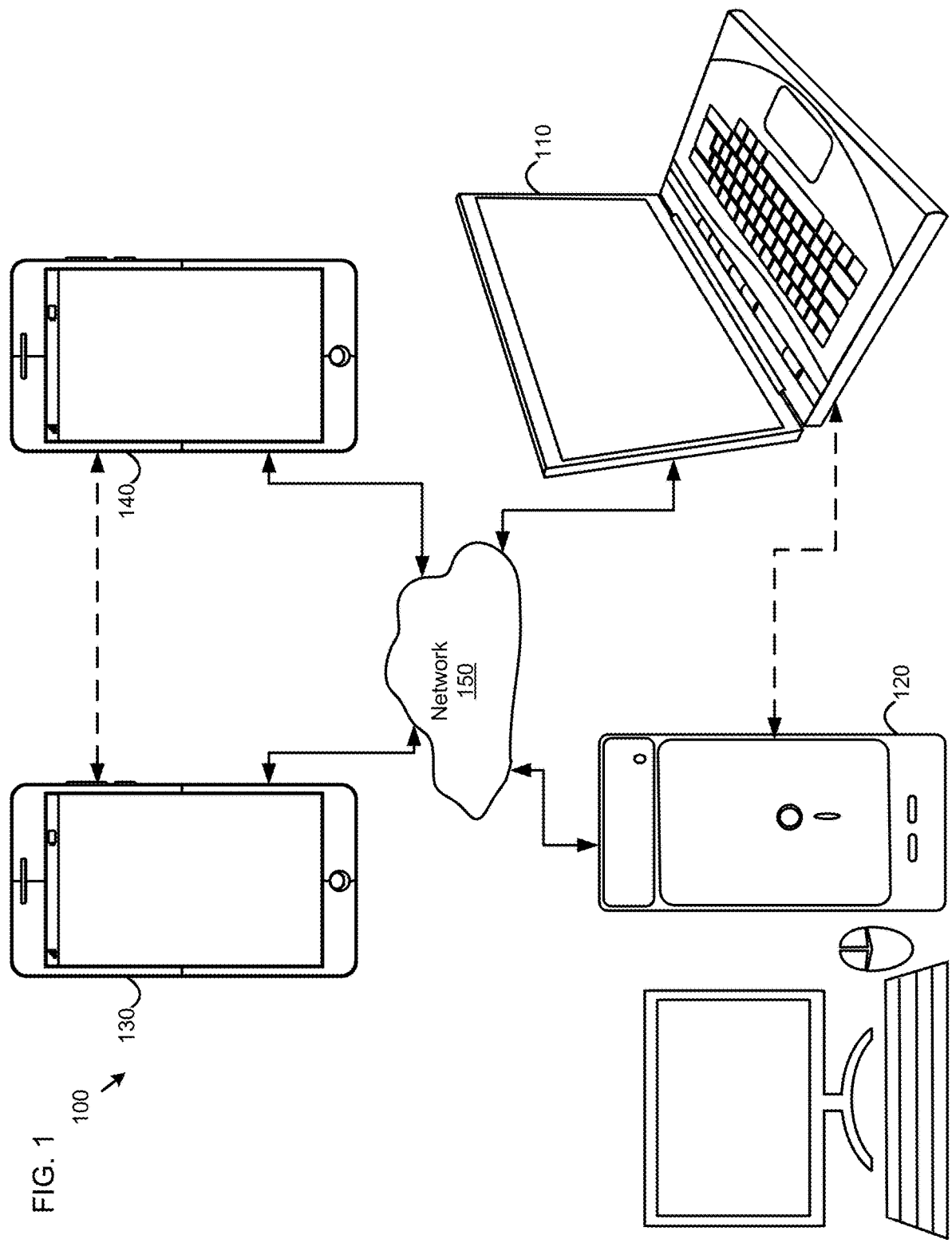
FIG. 1 is a block diagram of a communication system according to embodiments.

FIG. 1 is a block diagram of a communication system 100 according to embodiments. The communication system 100 may include at least two terminals 110 and 120 interconnected via a network 150. For unidirectional transmission of data, a first terminal 110 may code point cloud data at a local location for transmission to a second terminal 120 via the network 150. The second terminal 120 may receive the coded point cloud data of the first terminal 110 from the network 150, decode the coded point cloud data and display the decoded point cloud data. Unidirectional data transmission may be common in media serving applications and the like.

FIG. 1 further illustrates a second pair of terminals 130 and 140 provided to support bidirectional transmission of coded point cloud data that may occur, for example, during videoconferencing. For bidirectional transmission of data, each terminal 130 or 140 may code point cloud data captured at a local location for transmission to the other terminal via the network 150. Each terminal 130 or 140 also may receive the coded point cloud data transmitted by the other terminal, may decode the coded point cloud data and may display the decoded point cloud data at a local display device.

In FIG. 1, the terminals 110-240 may be illustrated as servers, personal computers and smartphones, but principles of the embodiments are not so limited. The embodiments find application with laptop computers, tablet computers, media players and/or dedicated video conferencing equipment. The network 150 represents any number of networks that convey coded point cloud data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, an architecture and topology of the network 150 may be immaterial to an operation of the embodiments unless explained herein below.

Figure 2:
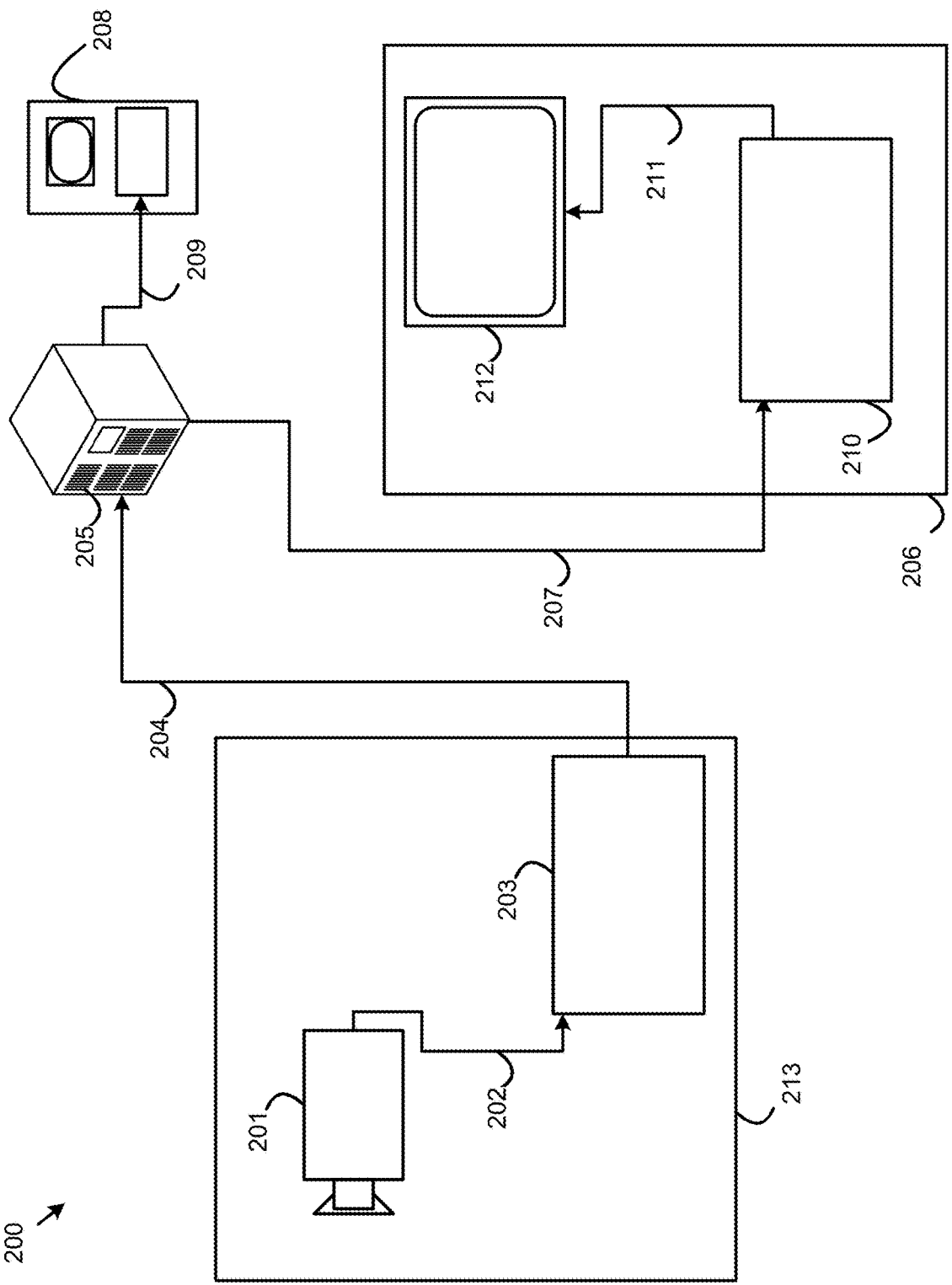
FIG. 2 is a diagram of a placement of a G-PCC compressor and a G-PCC decompressor in an environment, according to embodiments.

FIG. 2 is a diagram of a placement of a G-PCC compressor 203 and a G-PCC decompressor 210 in an environment, according to embodiments. The disclosed subject matter can be equally applicable to other point cloud enabled applications, including, for example, video conferencing, digital TV, storing of compressed point cloud data on digital media including CD, DVD, memory stick and the like, and so on.

A streaming system 200 may include a capture subsystem 213 that can include a point cloud source 201, for example a digital camera, creating, for example, uncompressed point cloud data 202. The point cloud data 202 having a higher data volume can be processed by the G-PCC compressor 203 coupled to the point cloud source 201. The G-PCC compressor 203 can include hardware, software, or a combination thereof to enable or implement aspects of the disclosed subject matter as described in more detail below. Encoded point cloud data 204 having a lower data volume can be stored on a streaming server 205 for future use. One or more streaming clients 206 and 208 can access the streaming server 205 to retrieve copies 207 and 209 of the encoded point cloud data 204. A client 206 can include the G-PCC decompressor 210, which decodes an incoming copy 207 of the encoded point cloud data and creates outgoing point cloud data 211 that can be rendered on a display 212 or other rendering devices (not depicted). In some streaming systems, the encoded point cloud data 204, 207 and 209 can be encoded according to video coding/compression standards. Examples of those standards include those being developed by MPEG for G-PCC.

Figure 3:
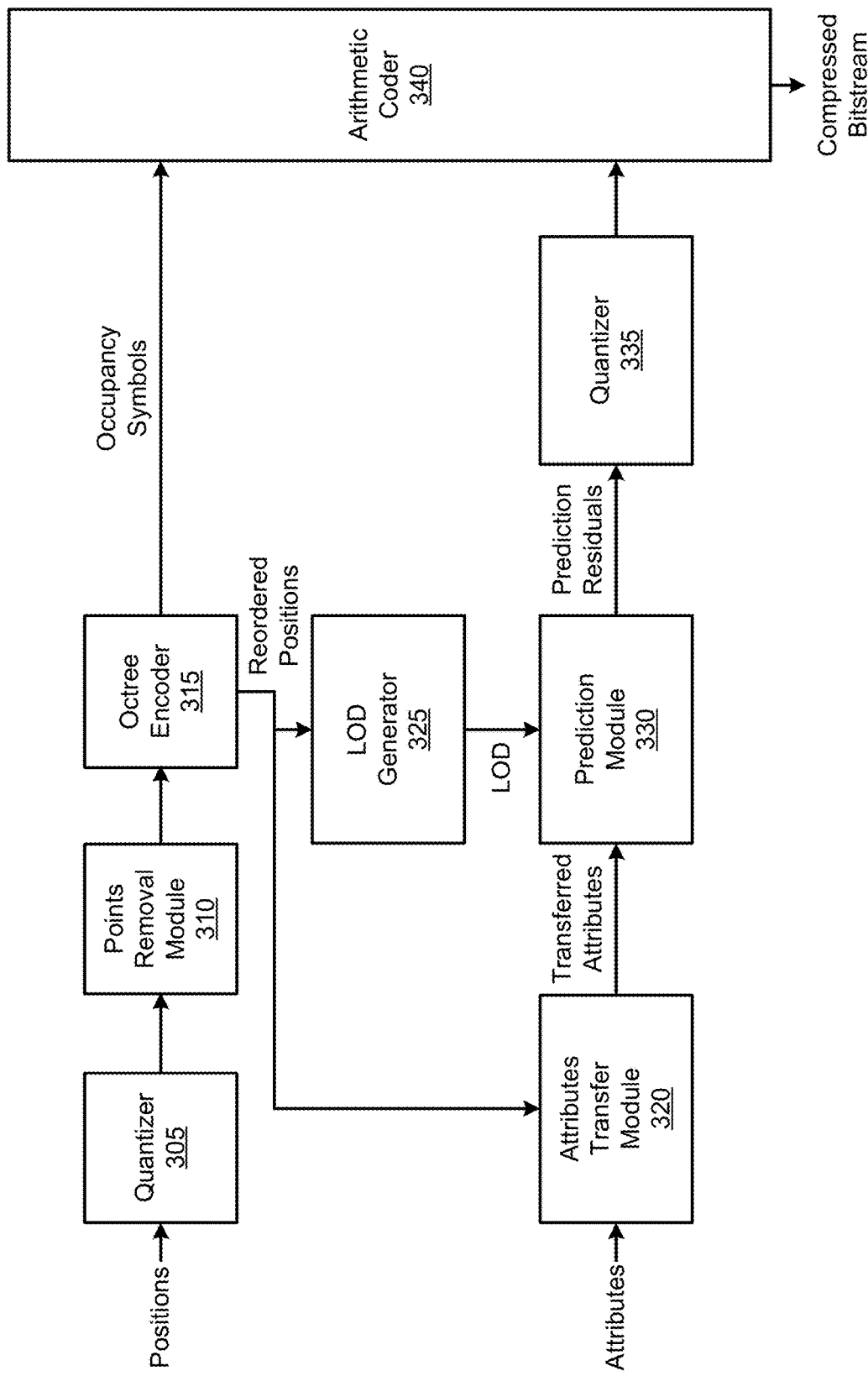
FIG. 3 is a functional block diagram of the G-PCC compressor according to embodiments.

FIG. 3 is a functional block diagram of a G-PCC compressor 203 according to embodiments.

As shown in FIG. 3, the G-PCC compressor 203 includes a quantizer 305, a points removal module 310, an octree encoder 315, an attributes transfer module 320, an LoD generator 325, a prediction module 330, a quantizer 335 and an arithmetic coder 340.

The quantizer 305 receives positions of points in an input point cloud. The positions may be (x,y,z)-coordinates. The quantizer 305 further quantizes the received positions, using, e.g., a scaling algorithm and/or a shifting algorithm.

The points removal module 310 receives the quantized positions from the quantizer 305, and removes or filters duplicate positions from the received quantized positions.

The octree encoder 315 receives the filtered positions from the points removal module 310, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 315 further reorders the received filtered positions, based on the encoding of the filtered positions.

The attributes transfer module 320 receives attributes of points in the input point cloud. The attributes may include, e.g., a color or RGB value and/or a reflectance of each point. The attributes transfer module 320 further receives the reordered positions from the octree encoder 315.

The attributes transfer module 320 further updates the received attributes, based on the received reordered positions. For example, the attributes transfer module 320 may perform one or more among pre-processing algorithms on the received attributes, the pre-processing algorithms including, for example, weighting and averaging the received attributes and interpolation of additional attributes from the received attributes. The attributes transfer module 320 further transfers the updated attributes to the prediction module 330.

The LoD generator 325 receives the reordered positions from the octree encoder 315, and obtains an LoD of each of the points corresponding to the received reordered positions. Each LoD may be considered to be a group of the points, and may be obtained based on a distance of each of the points.

The prediction module 330 receives the transferred attributes from the attributes transfer module 320, and receives the obtained LoD of each of the points from the LoD generator 325. The prediction module 330 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

The quantizer 335 receives the obtained prediction residuals from the prediction module 330, and quantizes the received predicted residuals, using, e.g., a scaling algorithm and/or a shifting algorithm.

The arithmetic coder 340 receives the occupancy symbols from the octree encoder 315, and receives the quantized prediction residuals from the quantizer 335. The arithmetic coder 340 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 4:
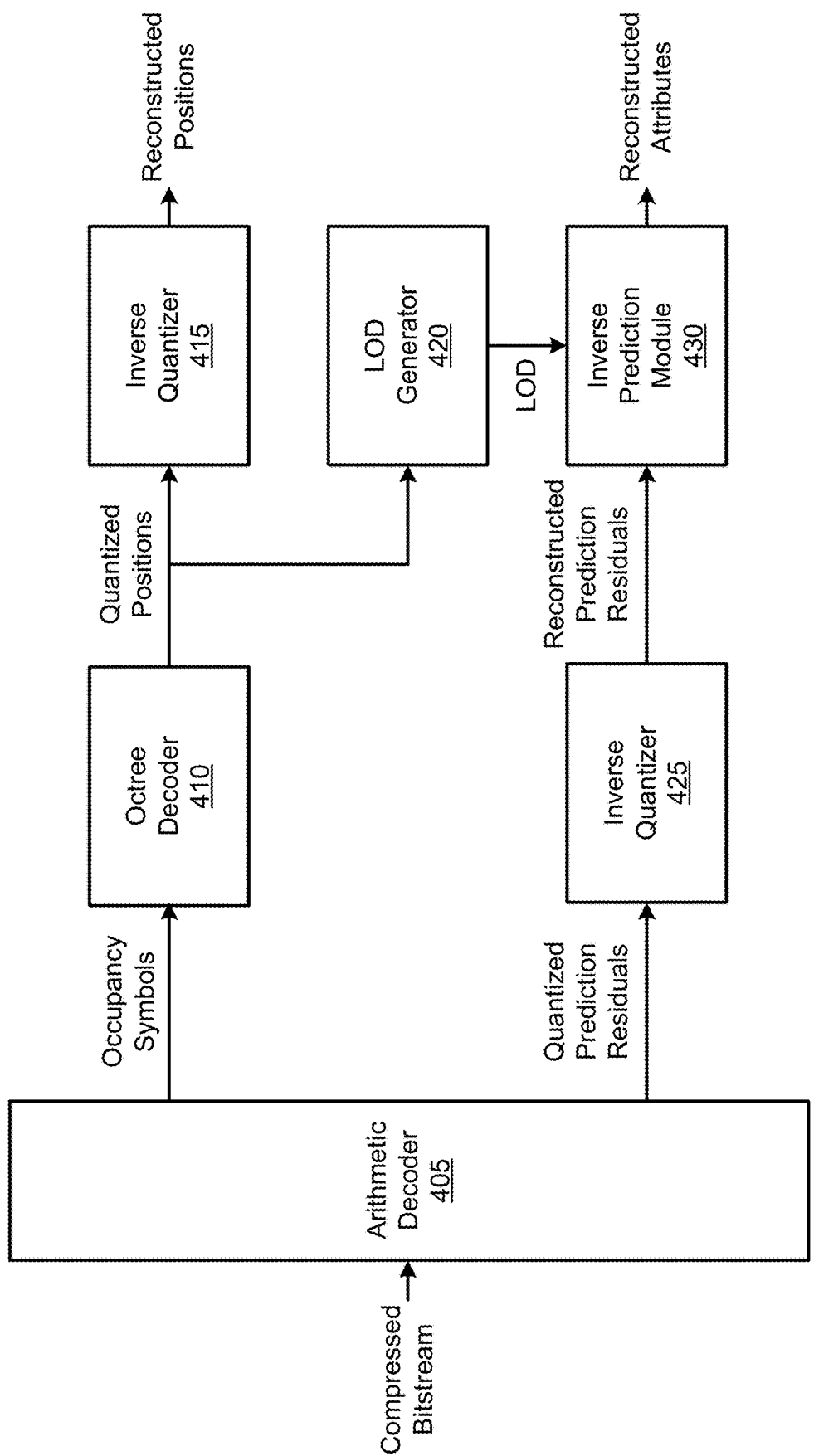
FIG. 4 is a functional block diagram of the G-PCC decompressor according to embodiments.

FIG. 4 is a functional block diagram of a G-PCC decompressor 210 according to embodiments.

As shown in FIG. 4, the G-PCC decompressor 210 includes an arithmetic decoder 405, an octree decoder 410, an inverse quantizer 415, an LoD generator 420, an inverse quantizer 425 and an inverse prediction module 430.

The arithmetic decoder 405 receives the compressed bitstream from the G-PCC compressor 203, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 410 receives the obtained occupancy symbols from the arithmetic decoder 405, and decodes the received occupancy symbols into the quantized positions, using an octree decoding algorithm.

The inverse quantizer 415 receives the quantized positions from the octree decoder 410, and inverse quantizes the received quantized positions, using, e.g., a scaling algorithm and/or a shifting algorithm, to obtain reconstructed positions of the points in the input point cloud.

The LoD generator 420 receives the quantized positions from the octree decoder 410, and obtains the LoD of each of the points corresponding to the received quantized positions.

The inverse quantizer 425 receives the obtained quantized prediction residuals, and inverse quantizes the received quantized prediction residuals, using, e.g., a scaling algorithm and/or a shifting algorithm, to obtain reconstructed prediction residuals.

The inverse prediction module 430 receives the obtained reconstructed prediction residuals from the inverse quantizer 425, and receives the obtained LoD of each of the points from the LoD generator 420. The inverse prediction module 430 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

The method and the apparatus for inter-channel prediction and transform for point cloud attribute coding will now be described in detail. Such a method and an apparatus may be implemented in the G-PCC compressor 203 described above, namely, the prediction module 430. The method and the apparatus may also be implemented in the G-PCC decompressor 210, namely, the inverse prediction module 430.

Figure 5:
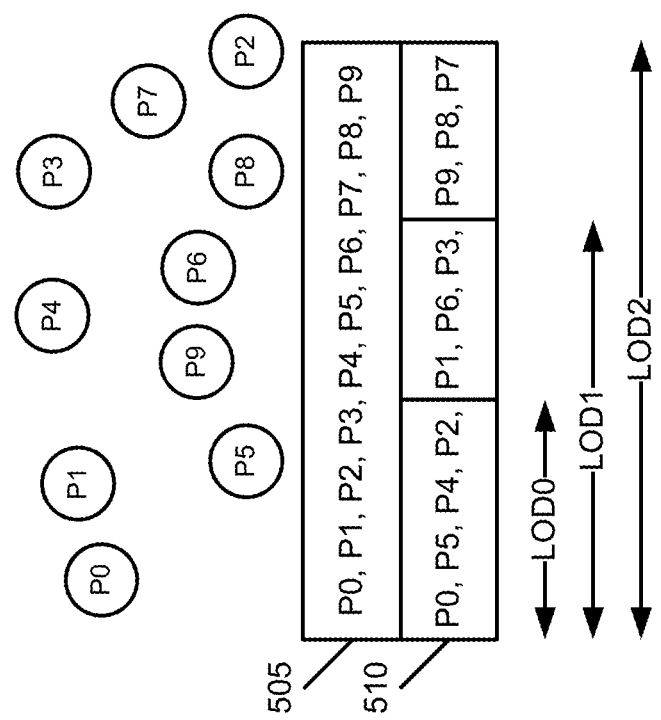

FIG. 5 is a diagram illustrating a method of generating levels of detail (LoD) in G-PCC.

Referring to FIG. 5, in current G-PCC attributes coding, an LoD (i.e., a group) of each 3D point (e.g., P0-P9) is generated based on a distance of each 3D point, and then attribute values of 3D points in each LoD is encoded by applying prediction in an LoD-based order 510 instead of an original order 505 of the 3D points. For example, an attributes value of the 3D point P2 is predicted by calculating a distance-based weighted average value of the 3D points P0, P5 and P4 that were encoded or decoded prior to the 3D point P2.

A current anchor method in G-PCC proceeds as follows.

First, a variability of a neighborhood of a 3D point is computed to check how different neighbor values are, and if the variability is lower than a threshold, the calculation of the distance-based weighted average prediction is conducted by predicting attribute values $(a_i)_{i \in 0 \ldots k-1}$, using a linear interpolation process based on distances of nearest neighbors of a current point i. Let $\aleph_i$ be a set of k-nearest neighbors of the current point i, let $(\tilde{a}_j)_{j \in \aleph_i}$ be their decoded/reconstructed attribute values and let $(\delta_j)_{j \in \aleph_i}$ be their distances to the current point i. A predicted attribute value $\hat{a}_i$ is then given by:

$$\hat{a}_i = \text{Round}\left(\frac{1}{k}\Sigma_{j \in N_i} \frac{\frac{1}{\delta_j^2}}{\Sigma_{j \in N_i}\frac{1}{\delta_j^2}} \tilde{a}_j\right).$$

Note that geometric locations of all point clouds are already available when attributes are coded. In addition, the neighboring points together with their reconstructed attribute values are available both at an encoder and a decoder as a k-dimensional tree structure that is used to facilitate a nearest-neighbor search for each point in an identical manner.

Second, if the variability is higher than the threshold, a rate-distortion optimized (RDO) predictor selection is performed. Multiple predictor candidates or candidate predicted values are created based on a result of a neighbor point search in generating LoD. For example, when the attributes value of the 3D point P2 is encoded by using prediction, a weighted average value of distances from the 3D point P2 to respectively the 3D points P0, P5 and P4 is set to a predictor index equal to 0. Then, a distance from the 3D point P2 to the nearest neighbor point P4 is set to a predictor index equal to 1. Moreover, distances from the 3D point P2 to respectively the next nearest neighbor points P5 and P0 are set to predictor indices equal to 2 and 3, as shown in Table 1 below.

TABLE 1

| Sample of predictor candidate for attributes coding | |
|---|---|
| Predictor index | Predicted value |
| 0 | average |
| 1 | P4 (1$^{st}$ nearest point) |
| 2 | P5 (2$^{nd}$ nearest point) |
| 3 | P0 (3$^{rd}$ nearest point) |

After creating predictor candidates, a best predictor is selected by applying a rate-distortion optimization procedure, and then, a selected predictor index is mapped to a truncated unary (TU) code, bins of which will be arithmetically encoded. Note that a shorter TU code will be assigned to a smaller predictor index in Table 1.

A maximum number of predictor candidates MaxNumCand is defined and is encoded into an attributes header. In the current implementation, the maximum number of predictor candidates MaxNumCand is set to equal to numberOfNearestNeighborsInPrediction+1 and is used in encoding and decoding predictor indices with a truncated unary binarization.

Figure 6:
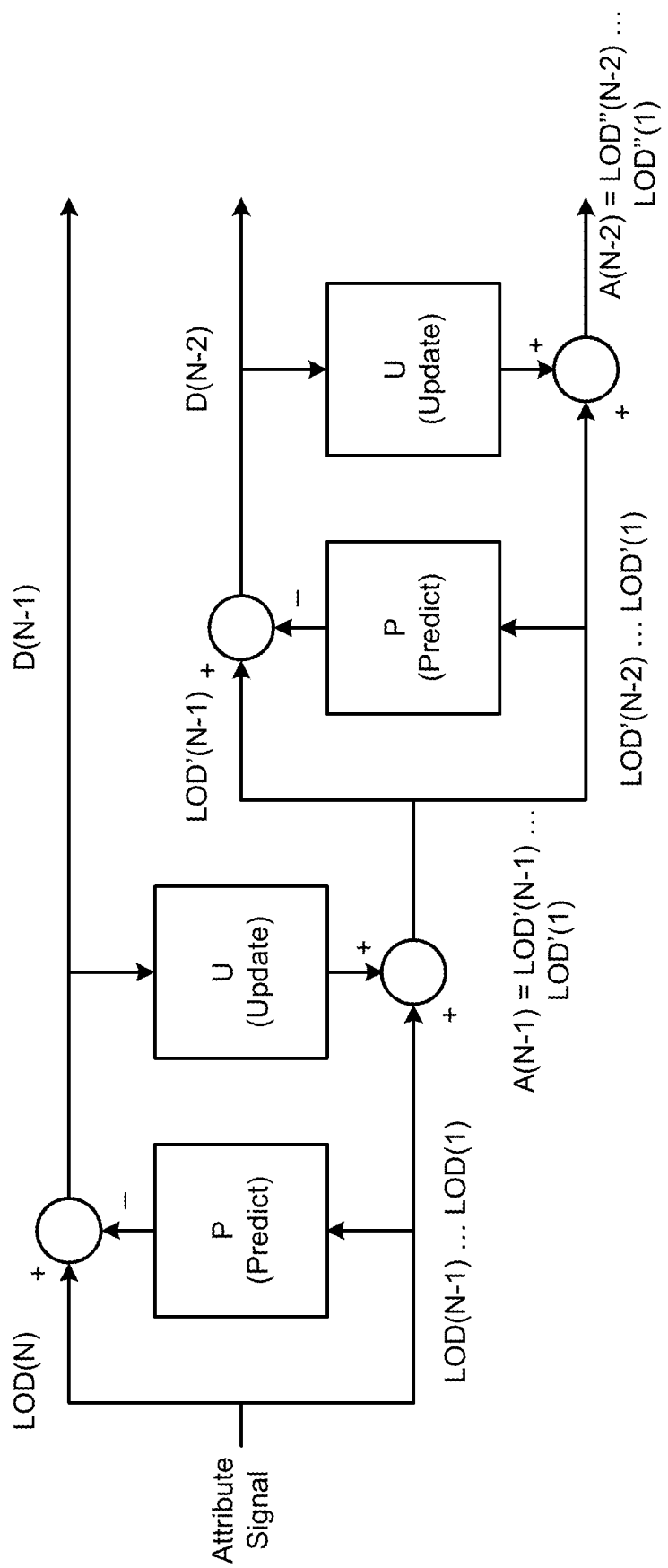
FIG. 6 is a diagram of an architecture for P/U-lifting in G-PCC.

FIG. 6 is a diagram of an architecture for P/U (Prediction/Update)-lifting in G-PCC. To facilitate prediction and update steps in lifting, one has to split a signal into two sets of high-correlation at each stage of decomposition. In the lifting scheme in G-PCC, the splitting is performed by leveraging an LoD structure in which such high-correlation is expected among levels and each level is constructed by a nearest neighbor search to organize non-uniform point clouds into a structured data. A P/U decomposition step at a level N results in a detail signal D(N−1) and an approximation signal A(N−1), which is further decomposed into D(N−2) and A(N−2). This step is repeatedly applied until a base layer approximation signal A(1) is obtained.

Consequently, instead of coding an input attribute signal itself that consists of LOD(N), . . . , LOD(1), one ends up coding D(N−1), D(N−2), . . . , D(1), A(1) in the lifting scheme. Note that application of efficient P/U steps often leads to sparse sub-bands "coefficients" in D(N−1), . . . , D(1), thereby providing a transform coding gain advantage.

Currently, a distance-based weighted average prediction described above for the predicting transform is used for a prediction step in the lifting as an anchor method in G-PCC.

For point cloud attributes such as color, there may be significant redundancy among channels.

In order to improve coding efficiency, a color space conversion is often performed as a pre-/post-processing step. One problem of color-space conversion as a pre-/post-processing step is that they often lack orthonormality and optimizing the codec performance in the converted color space does not necessarily translate into a good quality in the original space. In addition, lossless color transforms tend to have extended bit-depths especially when one tries to approximate the non-integer color transform with a good precision. This can be an issue depending on the implementation constraints in many practical systems.

Embodiments may efficiently perform inter-channel decorrelation for compression efficiency.

Embodiments discussed herein may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Embodiments may directly pertain to the current G-PCC predictor design described above. These methods can be applied to similar codecs designed for point clouds.

In embodiments, two methods may be used to avoid the aforementioned problems of using color-space transform as a conversion tool for coding efficiency.

One is to use YCoCg-R as a lossless inloop transform of prediction residuals in DPCM (aka Predicting Transform) for G-PCC to decorrelate inter-channel dependency while maintaining near-lossless and lossless reconstruction. Another is to introduce another step of prediction to predict residual values of other channels in DPCM for G-PCC.

The YCoCg transform according to embodiments is show below as Equation 1 and Equation 2:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \quad \text{(Equation 1)}$$

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix} \quad \text{(Equation 2)}$$

As a lossless transform derived from YCoCg, an example of a forward YCoCg-R is shown below as Equations 3 through 6:

$$Co = R - B \quad \text{(Equation 3)}$$

$$t = B + (Co \gg 1) \quad \text{(Equation 4)}$$

$$Cg = G - t \quad \text{(Equation 5)}$$

$$Y = t + (Cg \gg 1) \quad \text{(Equation 6)}$$

An example of a backward YCoCg-R which reverses the above process is shown below as Equations 7 through 10:

$$t = Y - (Cg \gg 1) \quad \text{(Equation 7)}$$

$$G = Cg + t; \quad \text{(Equation 8)}$$

$$B = t - (Co \gg 1) \quad \text{(Equation 9)}$$

$$R = B + Co \quad \text{(Equation 10)}$$

Now, when applying this as a residual-transform as proposed in embodiments, the signal R, G, and B may be prediction residuals of each channel resulting from per channel prediction in G-PCC.

In embodiments, another way of decorrelating a multi-channel signal is to use a predictor. For example, a predictor may be used to predict residual signals of the channels so that the second order residual will be quantized and entropy-coded instead of the original residuals.

For G-PCC prediction design, an example is shown below according to embodiments, wherein the bold parts indicate changes to a current TMC3 specification according to embodiments. Any general form of linear or nonlinear predictor function can be introduced for possible improvement of this prediction.

In the below examples, where "X" indicates a channel X signal, "X_pred" may indicate predicted channel X signal (obtained from reconstructed neighbor samples in G-PCC), "X_delta_index" may indicate quantization index of the prediction residual of channel X, "X_delta_recon" may indicate reconstructed residual for channel X, "X_recon" may indicate reconstructed channel X signal, and "X_delta_residual_index" may indicate the quantization index of the residual from the residual-prediction.

An example of an encoding process including inter-channel residual predication may proceed as follows:
G-Channel
    G_delta_index←Quantize(G−G_pred)
    G_delta_recon←InverseQuantize(G_delta_index)
    G_recon←G_pred+G_delta_recon
    EntopyEncode(G_delta_index)
C-Channels ('C' can be Either R or B)
    C_delta_index←Quantize(C−C_pred)
    C_delta_recon←InverseQuantize(C_delta_index)
    C_delta_residual_index←Quantize (C_delta_recon−G_delta_recon)
    C_delta_recon←InverseQuantize(C_delta_residual_index)+G_delta_recon
    C_recon←C_pred+C_delta_recon
    EntopyEncode(C_delta_residual_index)

An example of a decoding process including inter-channel residual predication may proceed as follows:
G-Channel
    G_delta_index←EntropyDecode( )
    G_delta_recon←InverseQuantize(G_delta_index)
    G_recon←G_pred+G_delta_recon
C-Channels ('C' can be Either R or B)
    C_delta_residual_index←EntropyDecode( )
    C_delta_recon←InverseQuantize(C_delta_residual_index)+G_delta_recon
    C_recon←C_pred+C_delta_recon Embodiments consistent with the inter-channel residual predictor for G-PCC and similar point cloud codecs may have some advantages. For example, the change in the decoding process is very minor. In addition it does not require any elaborate multi-channel signal model. Further, unlike other lossless color transform-based approaches for inter-channel decorrelation including the inloop residual transform described above, Embodiments may control the fidelity of the signal in the original domain in terms of Hausdorff metric. This may be because the quantization may be performed in the original (RGB color-) space.

In embodiments, the inter-channel residual predictor may be used with the current G-PCC working-draft specification.

In the attribute parameter set syntax, one can add a flag to adaptively enable/disable the proposed inter-channel residual predictor. An example of an attribute parameter set syntax is shown in Tables 2 and 3 below.

TABLE 2

|  | Descriptor |
|---|---|
| attribute_parameter_set( ) { |  |
|     aps_attr_parameter_set_id | ue(v) |
|     aps_seq_parameter_set_id | ue(v) |
|     attr_coding_type | ue(v) |
|     aps_attr_initial_qp | ue(v) |
|     aps_attr_chroma_qp_offset | se(v) |
|     aps_slice_qp_delta_present_flag | u(1) |
|     isLifting = ( attr_coding_type = = 0 \|\| attr_coding_type = = 2 ) ? 1 : 0 |  |
|     if( isLifting ) { |  |
|         lifting_num_pred_nearest_neighbours | ue(v) |
|         lifting_max_num_direct_predictors | ue(v) |
|         lifting_search_range_minus1 | ue(v) |
|         lifting_lod_regular_sampling_enabled_flag | u(1) |
|         lifting_num_detail_levels_minus1 | ue(v) |
|         for( idx = 0; idx <= num_detail_levels_minus1; idx++ ) { |  |
|             if ( lifting_lod_decimation_enabled_flag ) |  |
|                 lifting_sampling_period[ idx ] | ue(v) |
|             else |  |
|                 lifting_sampling_distance_squared[ idx ] | ue(v) |
|         } |  |
|     } |  |

TABLE 2

|  | Descriptor |
|---|---|
|     if( attr_coding_type = = 0 ) { |  |
|         lifting_adaptive_prediction_threshold | ue(v) |
|         lifting_intra_lod_prediction_num_layers | ue(v) |
|         lifting_residual_prediction_enabled_flag | u(1) |
|     } |  |
|     if( attribute_coding_type = = 1 ) { //RAHT |  |
|         raht_prediction_enabled_flag | u(1) |
|         raht_depth_minus1 | ue(v) |
|     } |  |
|     if( attribute_coding_type = = 2 ) { |  |
|         lifting_scalability_enabled_flag | u(1) |
|     } |  |
|     aps_extension_present_flag | u(1) |
|     if( aps_extension_present_flag ) |  |
|         while( more_data_in_byte_stream( ) ) |  |
|             aps_extension_data_flag | u(1) |
|     byte_alignment( ) |  |
| } |  |

In embodiments, according to the attribute parameter set semantics, lifting_residual_prediction_enabled_flag equal to 1 may specify that the attribute decoding process performs the residual prediction.

An example of a predictive lifting decoding process is shown below, according to embodiments:

```
q = 0;
for (i = 0; i < PointNum; i++) {
   currentIndex = indexes[i];
   for (j = 0; j < attrCnt; j++) {
      minPredAttribute[j] = 0;
      maxPredAttribute[j] = 0;
      predicted[j] = 0;
   }
   for(p = 0; p < neighboursCount[index]; p++) {
      neighbourIndex = neighbours [index][p];
      for (j = 0; j < attrCnt; j++) {
         if (p == 0 || minPredAttribute[j] > attributeValues
         [ neighbourIndex][ j ]) {
            minPredAttribute[j] = attributeValues[ neighbourIndex][ j ];
         }
         if (p == 0 || maxPredAttribute[j] < attributeValues
         [ neighbourIndex][ j ]) {
            maxPredAttribute [j] = attributeValues[ neighbourIndex][ j ];
         }
      }
   }
   maxDiff = maxPredAttribute[0] − minPredAttribute[0];
   for (j = 1; j < attrCnt; j++)
      maxDiff = max(maxDiff, maxPredAttribute[j] − minPredAttribute[j]);
   if (maxDiff > adaptivePredictionThreshold)
      predMode = predictorIndexes[ q++ ];
   else
      predMode = 0;
   if ( predMode > 0 ) {
      neighbourindex = neighbours[ index ][ predMode − 1 ];
      for (j = 1; j < attrCnt; j++)
         predicted[j] = attributeValues[ neighbourIndex][ j ];
   } else {
      for (j = 0; j < attrCnt; j++) {
         for(p = 0; p < neighboursCount[index]; p++) {
            neighbourindex = neighbours[index][p];
            weight = predictionWeights[index][p];
            predicted[j] += weight × attributeValues[ neighbourIndex][ j ];
         }
         predicted[j] = divExp2RoundHalfInf(predicted[j],
         FixedPointWeightShift);
      }
   }
   for (j = 0; j < attrCnt; j++) {
      res = divExp2RoundHalfInf(unquantAttributeCoefficients
      [ currentIndex ][ j ], FixedPointAttributeShift);
      attributeValue = predicted[j] + res;
      attributeValues[ currentIndex][ j ] = Clip(attributeValue,
      minAttribute, maxAttribute);
   }
   res = divExp2RoundHalfInf(unquantAttributeCoefficients
```

```
[ currentIndex ][ 0 ], FixedPointAttributeShift);
base Res = res;
attributeValue = predicted[0]+ res;
attributeValues[ currentIndex][0] = Clip(attributeValue, minAttribute,
maxAttribute);
    for (j = 1; j < attrCnt; j++) {
res = divExp2RoundHalfInf(unquantAttributeCoefficients
[ currentIndex ][ j ], FixedPointAttributeShift);
if (lifting_residual_prediction_enabled_flag==1)
    res += baseRes;
attributeValue = predicted[j] + res;
    attributeValues[currentIndex][ j ] = Clip(attributeValue,
minAttribute, maxAttribute);
    }
}
```

In the above example, text that is intended to be presented as "struck through" has been italicized, and j=0 may correspond to G-channel.

The following embodiments may apply equally to both the inloop color-residual transform and color-residual prediction under the context of DPCM prediction, which may also be referred to as Predicting-Transform, in G-PCC. In embodiments, these two techniques may be referred to as the inter-channel tool.

In embodiments, several methods of a conditional check may be used for deciding whether to apply the inter-channel tool to the current point.

In embodiments, the maximum difference of reconstructed residual values of three channels may be computed for each of nearest-neighbors. More specifically, the decoder can track how many neighbors experienced reduced residual magnitude/variance after applying the inter-channel tool by a set threshold. Especially when the three reconstructed residual values are relatively even, the chances are the decorrelation was not successful. A bookkeeping of one-flag may be used to indicate the result of such testing per each point when decoded. Also one can do a majority-voting when making a decision.

In embodiments, the maximum absolute difference values of three channels from neighbor points may be compared. When there is a significant difference in the variability of values among color channels, the chances are that predicting one from another can be difficult.

Any measure that can identify inter-channel correlation from neighbor samples can be incorporated to determine the use of the inter-channel tools.

In embodiments, a tile/slice-level (e.g., in tile/slice header) or a video/picture-level (e.g., in SPS/PPS) flag can be signaled to enable/disable the proposed residual transform or prediction. The signaling can be applied to any grouping of point-cloud pixels that constitutes a coding-unit.

Embodiments discussed above may also be applied to the lifting scheme in G-PCC. Because the detail subband coefficients may be the output from the Predict-step of lifting, these may be prediction residual signals and they may be similar among different color channels given an identical prediction strategy.

For G-PCC lifting design, an example is shown below according to embodiments, wherein the bold parts indicate changes to a current TMC3 specification according to embodiments. Any general form of linear or nonlinear predictor function can be introduced for possible improvement of this prediction.

In the below examples, where "X" indicates a channel X signal, "X_coeff_index" may indicate quantization index of a lifting coefficient of channel X, "X_coeff_recon" may indicate reconstructed lifting coefficient for channel X, "X_recon" may indicate reconstructed channel X signal, "X_coeff_residual_index" may indicate the quantization index of the residual from the residual-prediction, "quant-Weight" may indicate weighting factor used in G-PCC which is applied to the lifting coefficient before quantization at the encoder and after dequantization at the decoder.

An example of an encoding process including such an extension to a lifting scheme may proceed as follows:

G-Channel
    G_coeff_index←Quantize(G)
    G_coeff_recon←InverseQuantize(G_coeff_index)
    G_recon←G_coeff_recon/quantWeight
    EntopyEncode(G_coeff_index)
C-Channels ('C' can be Either R or B)
    C_coeff_index←Quantize(C)
    C_coeff_recon←InverseQuantize(C_coeff_index)
    C_coeff_residual_index←Quantize (C_coeff_recon−G_coeff_recon)
    C_ceoff_recon←InverseQuantize(C_coeff_residual_index)+G_coeff_recon
    C_recon←C_coeff_recon/quantWeight
    EntopyEncode(C_coeff_residual_index)

An example of a decoding process including such an extension to a lifting scheme may proceed as follows:

G-Channel
    G_coeff_index←EntropyDecode( )
    G_coeff_recon←InverseQuantize(G_coeff_index)
    G_recon←G_coeff_recon/quantWeight
C-Channels ('C' can be Either R or B)
    C_coeff_residual_index←EntropyDecode( )
    C_coeff_recon←InverseQuantize(C_coeff_residual_index)+G_coeff_recon
    C_recon←C_coeff_recon/quantWeight Embodiments discussed herein can be implemented in a video encoder or decoder adapted for point cloud compression/decompression. In embodiments, the encoder/decoder can be implemented in hardware, software, or any combination thereof, and the software, if any, can be stored in on or more non-transitory computer readable media. For example, each of the methods (or embodiments), encoders, and decoders may be implemented by processing circuitry (e.g., one or more processors or one or more integrated circuits). In one example, the one or more processors execute a program that is stored in a non-transitory computer-readable medium.

Figure 7:
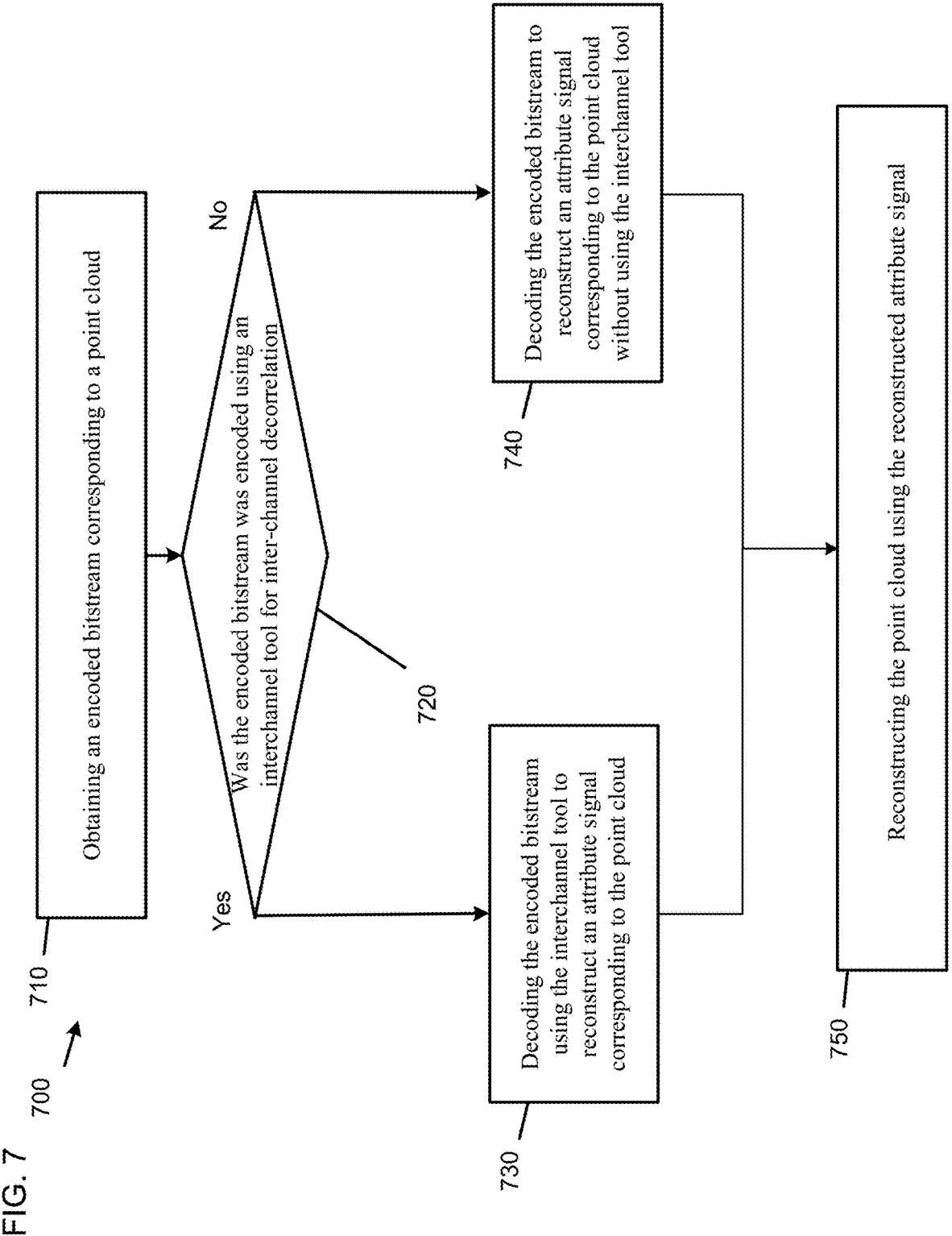
FIG. 7 is a flowchart illustrating a method for point cloud attribute coding, according to embodiments.

FIG. 7 is a flowchart illustrating a method 700 of point cloud attribute coding, according to embodiments. In some implementations, one or more process blocks of FIG. 7 may be performed by the G-PCC decompressor 210. In some implementations, one or more process blocks of FIG. 7 may be performed by another device or a group of devices separate from or including the G-PCC decompressor 210, such as the G-PCC compressor 203.

Referring to FIG. 7, in a first block 710, the method 700 includes obtaining an encoded bitstream corresponding to a point cloud.

In a second block 720, the method 700 includes determining whether the encoded bitstream was encoded using an inter-channel tool for inter-channel decorrelation.

Based on determining that the encoded bitstream was encoded using the inter-channel tool (YES at block 720), the method 700 continues in a third block 730. In the third block 730, the method 700 includes decoding the encoded bitstream using the inter-channel tool to reconstruct an attribute signal corresponding to the point cloud, and then proceeding to block 750.

Based on determining that the encoded bitstream was not encoded using the inter-channel tool (NO at block 720), the method 700 continues in a fourth block 740. In the fourth block 740, the method 700 includes decoding the encoded bitstream to reconstruct an attribute signal corresponding to the point cloud without using the inter-channel tool, and then proceeding to block 750.

In a fifth block 750, the method 700 includes reconstructing the point cloud using the reconstructed attribute signal.

In embodiments, the inter-channel tool may include an in loop color-residual transform.

In embodiments, the in loop color-residual transform may include a YCoCg-R transform.

In embodiments, the inter-channel tool may include an inter-channel color-residual predictor.

In embodiments, the decoding the encoded bitstream using the inter-channel tool may include obtaining a reconstructed residual for a first color channel; and obtaining a reconstructed residual for second color channel based on the reconstructed residual for the first color channel.

In embodiments, the encoded bitstream may be determined to be encoded using the inter-channel tool based on a flag signaled in the encoded bitstream.

In embodiments, the flag may be set in the encoded bitstream based on at least one from among a difference between values of color channels of neighboring points, or a difference between reconstructed residual values of the color channels of the neighboring points.

In embodiments, the method 700 may further include obtaining a reconstructed lifting coefficient for a first color channel; and obtaining a reconstructed lifting coefficient for second color channel based on the reconstructed lifting coefficient for the first color channel.

Although FIG. 7 shows example blocks of the method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
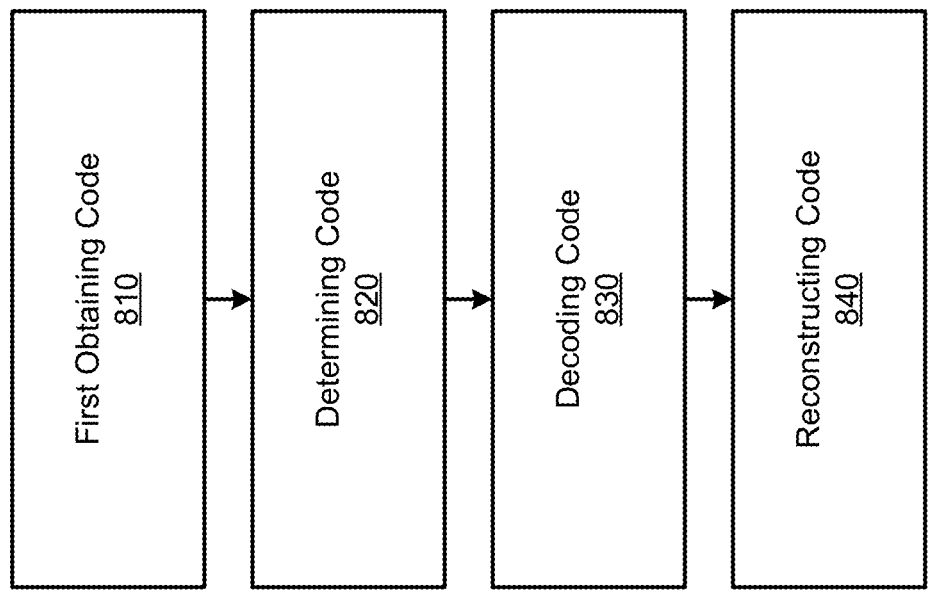
FIG. 8 is a block diagram of an apparatus for point cloud attribute coding, according to embodiments.

FIG. 8 is a block diagram of an apparatus 800 for point cloud attribute coding, according to embodiments.

Referring to FIG. 8, the apparatus 800 includes first obtaining code 810, determining code 820, decoding code 830, and reconstructing code 840.

The first obtaining code 810 is configured to cause the at least one processor to obtain an encoded bitstream corresponding to a point cloud.

The determining code 820 is configured to cause the at least one processor to determine whether the encoded bitstream was encoded using an inter-channel tool for inter-channel decorrelation.

The decoding code 830 is configured to cause the at least one processor to, based on determining that the encoded bitstream was encoded using the inter-channel tool, decode the encoded bitstream using the inter-channel tool to reconstruct an attribute signal corresponding to the point cloud.

The reconstructing code 840 is configured to cause the at least one processor to reconstruct the point cloud using the reconstructed attribute signal In embodiments, the inter-channel tool may include an in loop color-residual transform.

In embodiments, the in loop color-residual transform may include a YCoCg-R transform.

In embodiments, the inter-channel tool may include an inter-channel color-residual predictor.

In embodiments, the decoding code may include second obtaining code configured to cause the at least one processor to obtain a reconstructed residual for a first color channel; and third obtaining configured to cause the at least one processor to obtain a reconstructed residual for second color channel based on the reconstructed residual for the first color channel.

In embodiments, the encoded bitstream may be determined to be encoded using the inter-channel tool based on a flag signaled in the encoded bitstream.

In embodiments, the flag may be set in the encoded bitstream based on at least one from among a difference between values of color channels of neighboring points, or a difference between reconstructed residual values of the color channels of the neighboring points.

In embodiments, the apparatus 800 may further include fourth obtaining code configured to cause the at least one processor to obtain a reconstructed lifting coefficient for a first color channel; and fifth obtaining code configured to cause the at least one processor to obtain a reconstructed lifting coefficient for second color channel based on the reconstructed lifting coefficient for the first color channel.

Figure 9:
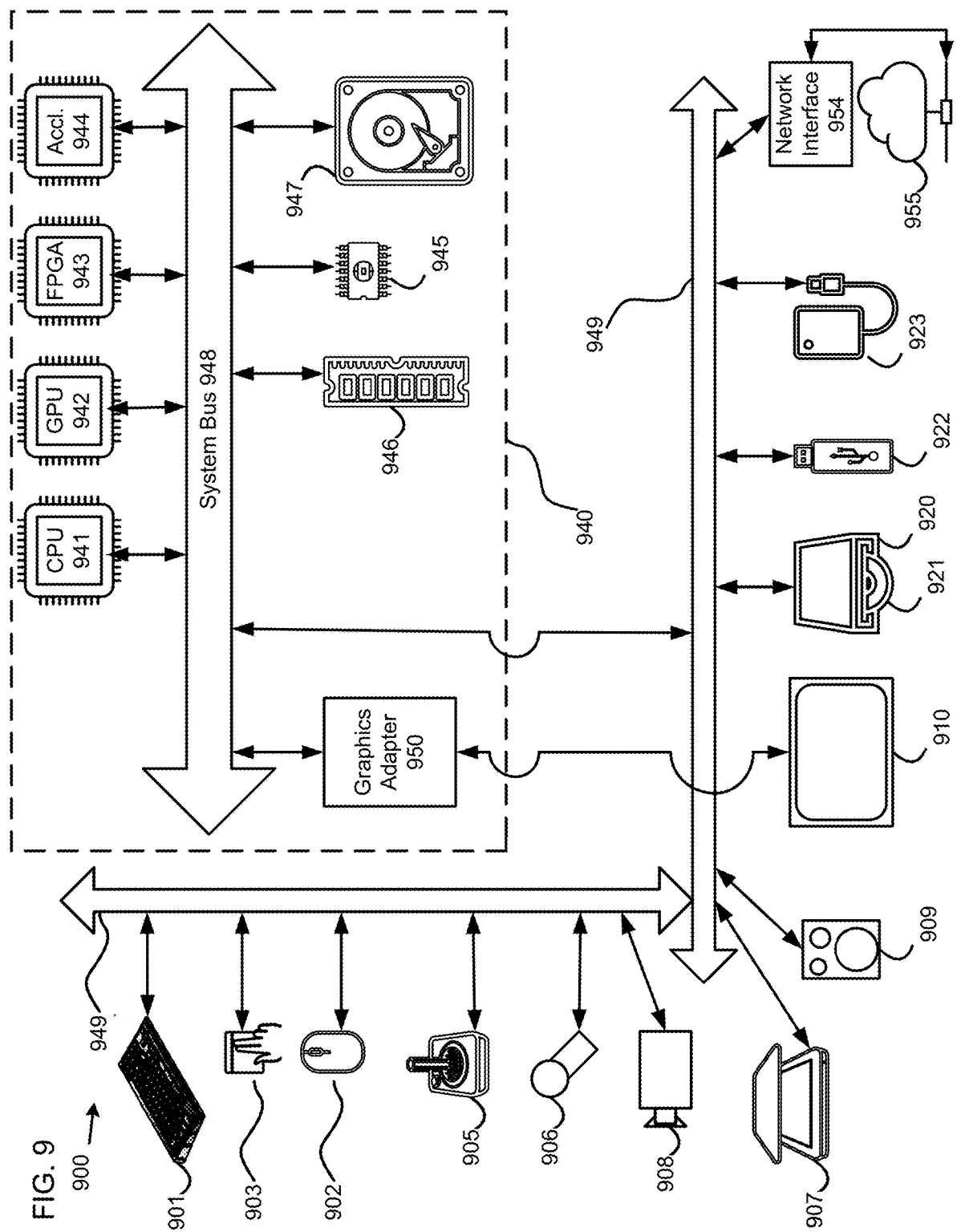
FIG. 9 is a diagram of a computer system suitable for implementing embodiments.

FIG. 9 is a diagram of a computer system 900 suitable for implementing embodiments.

Computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for the computer system 900 are examples in nature and are not intended to suggest any limitation as to the scope of use or functionality of the computer software implementing the embodiments. Neither should the configuration of the components be interpreted as having any dependency or requirement relating to any one or combination of the components illustrated in the embodiments of the computer system 900.

The computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): a keyboard 901, a mouse 902, a trackpad 903, a touchscreen 910, a joystick 905, a microphone 906, a scanner 907, and a camera 908.

The computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touchscreen 910 or the joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touchscreen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter 950 generates and outputs images to the touchscreen 910.

The computer system 900 can also include human accessible storage devices and their associated media such as optical media including a CD/DVD ROM/RW drive 920 with CD/DVD or the like media 921, a thumb drive 922, a removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system 900 can also include interface(s) to one or more communication networks 955. The communication networks 955 can for example be wireless, wireline, optical. The networks 955 can further be local, wide-area, metropolitan, vehicular and industrial, real-time, delay-tolerant, and so on. Examples of the networks 955 include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANbus, and so forth. The networks 955 commonly require external network interface adapters that attached to certain general purpose data ports or peripheral buses 949 (such as, for example universal serial bus (USB) ports of the computer system 900; others are commonly integrated into the core of the computer system 900 by attachment to a system bus as described below, for example, a network interface 954 including an Ethernet interface into a PC computer system and/or a cellular network interface into a smartphone computer system. Using any of these networks 955, the computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks 955 and network interfaces 954 as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with read-only memory (ROM) 945, random-access memory (RAM) 946, internal mass storage 947 such as internal non-user accessible hard drives, solid-state drives (SSDs), and the like, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through the peripheral buses 949. Architectures for a peripheral bus include peripheral component interconnect (PCI), USB, and the like.

The CPUs 941, GPUs 942, FPGAs 943, and hardware accelerators 944 can execute certain instructions that, in combination, can make up the aforementioned computer code. That computer code can be stored in the ROM 945 or RAM 946. Transitional data can also be stored in the RAM 946, whereas permanent data can be stored for example, in the internal mass storage 947. Fast storage and retrieve to any of the memory devices can be enabled through the use of cache memory, that can be closely associated with the CPU 941, GPU 942, internal mass storage 947, ROM 945, RAM 946, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as the core-internal mass storage 947 or ROM 945. The software implementing various embodiments can be stored in such devices and executed by the core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in the RAM 946 and modifying such data structures according to the processes defined by the software. In addition or as an alternative, the computer system can provide functionality as a result of logic hardwired or otherwise embodied in a circuit (for example: the hardware accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof

What is claimed is:

1. A method of point cloud attribute coding, the method being performed by at least one processor, and the method comprising:
    obtaining an encoded bitstream corresponding to a point cloud;
    determining whether the encoded bitstream was encoded using an inter-channel tool for inter-channel decorrelation;
    based on determining that the encoded bitstream was encoded using the inter-channel tool, decoding the encoded bitstream using the inter-channel tool to reconstruct an attribute signal corresponding to the point cloud; and
    reconstructing the point cloud using the reconstructed attribute signal,
    wherein the decoding the encoded bitstream using the inter-channel tool comprises:
        obtaining a reconstructed residual for a first color channel; and
        obtaining a reconstructed residual for second color channel using the reconstructed residual for the first color channel.

2. The method of claim 1, wherein the inter-channel tool comprises an in loop color-residual transform.

3. The method of claim 2, wherein the in loop color-residual transform comprises a YCoCg-R transform.

4. The method of claim 1, wherein the inter-channel tool comprises an inter-channel color-residual predictor.

5. The method of claim 1, wherein the encoded bitstream is determined to be encoded using the inter-channel tool based on a flag signaled in the encoded bitstream.

6. The method of claim 5, wherein the flag is set in the encoded bitstream based on at least one from among a difference between values of color channels of neighboring points, or a difference between reconstructed residual values of the color channels of the neighboring points.

7. The method of claim 1, further comprising:
    obtaining a reconstructed lifting coefficient for a first color channel; and
    obtaining a reconstructed lifting coefficient for second color channel based on the reconstructed lifting coefficient for the first color channel.

8. The method of claim 1, wherein the first color channel comprises a green color channel, and
    wherein the second color channel comprises one from among a red color channel and a blue color channel.

9. The method of claim 1, wherein the reconstructed residual for the first color channel is obtained based on at least one reconstructed neighbor sample.

10. An apparatus for point cloud attribute coding, the apparatus comprising:
    at least one memory configured to store computer program code; and
    at least one processor configured to access the at least one memory and operate according to the computer program code, the computer program code comprising:
        first obtaining code configured to cause the at least one processor to obtain an encoded bitstream corresponding to a point cloud;
        determining code configured to cause the at least one processor to determine whether the encoded bitstream was encoded using an inter-channel tool for inter-channel decorrelation;
        decoding code configured to cause the at least one processor to, based on determining that the encoded bitstream was encoded using the inter-channel tool, decode the encoded bitstream using the inter-channel tool to reconstruct an attribute signal corresponding to the point cloud; and
        reconstructing code configured to cause the at least one processor to reconstruct the point cloud using the reconstructed attribute signal,
    wherein the decoding code comprises:
        second obtaining code configured to cause the at least one processor to obtain a reconstructed residual for a first color channel; and
        third obtaining configured to cause the at least one processor to obtain a reconstructed residual for second color channel using the reconstructed residual for the first color channel.

11. The apparatus of claim 10, wherein the inter-channel tool comprises an in loop color-residual transform.

12. The apparatus of claim 11, wherein the in loop color-residual transform comprises a YCoCg-R transform.

13. The apparatus of claim 10, wherein the inter-channel tool comprises an inter-channel color-residual predictor.

14. The apparatus of claim 10, wherein the encoded bitstream is determined to be encoded using the inter-channel tool based on a flag signaled in the encoded bitstream.

15. The apparatus of claim 14, wherein the flag is set in the encoded bitstream based on at least one from among a difference between values of color channels of neighboring points, or a difference between reconstructed residual values of the color channels of the neighboring points.

16. The apparatus of claim 10, wherein the computer program code further comprises:
    fourth obtaining code configured to cause the at least one processor to obtain a reconstructed lifting coefficient for a first color channel; and
    fifth obtaining code configured to cause the at least one processor to obtain a reconstructed lifting coefficient for second color channel based on the reconstructed lifting coefficient for the first color channel.

17. A non-transitory computer-readable medium storing instructions, the instructions comprising: one or more instructions that are configured to, when executed by one or more processors of a device for point cloud attribute coding, cause the one or more processors to:
    obtain an encoded bitstream corresponding to a point cloud;
    determine whether the encoded bitstream was encoded using an inter-channel tool for inter-channel decorrelation;
    based on determining that the encoded bitstream was encoded using the inter-channel tool, decode the encoded bitstream using the inter-channel tool to reconstruct an attribute signal corresponding to the point cloud; and
    reconstruct the point cloud using the reconstructed attribute signal,
    wherein the decoding of the encoded bitstream using the inter-channel tool comprises:
        obtaining a reconstructed lifting coefficient for a first color channel; and
        obtaining a reconstructed lifting coefficient for second color channel using the reconstructed lifting coefficient for the first color channel.

18. The non-transitory computer-readable medium of claim 17, wherein the inter-channel tool comprises an in loop color-residual transform.

19. The non-transitory computer-readable medium of claim 17, wherein the inter-channel tool comprises an inter-channel color-residual predictor.

20. The non-transitory computer-readable medium of claim 17, wherein the one or more instructions are further configured to cause the one or more processor to:
   obtain a reconstructed lifting coefficient for a first color channel; and
   obtain a reconstructed lifting coefficient for second color channel based on the reconstructed lifting coefficient for the first color channel.

* * * * *